United States Patent
Kleppe et al.

(10) Patent No.: US 11,867,894 B2
(45) Date of Patent: Jan. 9, 2024

(54) METHOD FOR SIM MICROSCOPY

(71) Applicant: Carl Zeiss Microscopy GmbH, Jena (DE)

(72) Inventors: Ingo Kleppe, Jena (DE); Yauheni Novikau, Apolda (DE); Ralf Netz, Jena (DE)

( * ) Notice: Subject to any disclaimer, the term of this patent is extended or adjusted under 35 U.S.C. 154(b) by 0 days.

(21) Appl. No.: 17/470,456

(22) Filed: Sep. 9, 2021

(65) Prior Publication Data
US 2022/0075175 A1 Mar. 10, 2022

(30) Foreign Application Priority Data
Sep. 10, 2020 (DE) ..................... 10 2020 123 669.7

(51) Int. Cl.
 G02B 21/36 (2006.01)
 G01N 21/64 (2006.01)
 G02B 21/06 (2006.01)

(52) U.S. Cl.
 CPC ....... G02B 21/367 (2013.01); G01N 21/6458 (2013.01); G02B 21/06 (2013.01)

(58) Field of Classification Search
 CPC .. G02B 21/0076; G02B 21/06; G02B 21/367; G01N 21/6458
 See application file for complete search history.

(56) References Cited

U.S. PATENT DOCUMENTS

| | | | | |
|---|---|---|---|---|
| 6,630,660 B1* | 10/2003 | Finn | ........................ | G01S 3/781 250/237 G |
| 10,416,087 B2* | 9/2019 | Zhang | ................... | G06T 3/4053 |
| 10,613,478 B2* | 4/2020 | Cheng | ................... | G03H 1/041 |
| 2014/0313576 A1* | 10/2014 | Uhl | ..................... | G02B 21/0032 359/385 |
| 2020/0150043 A1* | 5/2020 | Kleppe | .................. | G02B 27/58 |

FOREIGN PATENT DOCUMENTS

| | | |
|---|---|---|
| DE | 102018009056 A1 | 5/2020 |
| WO | 2013049646 A1 | 4/2013 |

OTHER PUBLICATIONS

Rego, E.H., Shao, L. (2015). Practical Structured Illumination Microscopy. In: Verveer, P. (eds) Advanced Fluorescence Microscopy Methods in Molecular Biology, vol. 1251. Humana Press, New York, NY. https://doi.org/10.1007/978-1-4939-2080-8_10 (Year: 2015).*

(Continued)

*Primary Examiner* — William C Vaughn, Jr.
*Assistant Examiner* — Naod W Belai
(74) *Attorney, Agent, or Firm* — Duane Morris LLP

(57) ABSTRACT

A method for performing SIM microscopy on a sample, includes: generating n raw images of the sample, in each case by illuminating the sample using the same SIM illumination pattern albeit with an individual positioning for each raw image, wherein p orders of diffraction are assigned to the SIM illumination pattern, and generating an image of the sample from the n raw images. An image reconstruction is carried out using the orders of diffraction, wherein t highest orders of diffraction are suppressed during the image reconstruction and n=p−t applies.

16 Claims, 5 Drawing Sheets

(56) References Cited

OTHER PUBLICATIONS

Gustafsson et al. ("Three-Dimensional Resolution Doubling in Wide-Field Fluorescence Microscopy by Structured Illumination") Biophysical Journal vol. 94 Jun. 2008 4957-4970 (Year: 2008).*
Chowdhury et al. "Structured illumination fluorescence microscopy using Talbot self-imaging effect for high-throughput visualization" Submitted Wed, Jan. 10, 2018 20:09:15 UTC . 10 pages, 3 figures (Year: 2018).*
Neil, M., et al.; "Method of obtaining optical sectioning by using structured light in a conventional microscope"; Optics Letters 1997; 22(24):1905-1907; https://doi.org/10.1364/OL.22.001905.
Gustafsson, M., et al.; "Three-Dimensional Resolution Doubling in Wide-Field Fluorescence Microscopy by Structured Illumination"; Biophysical Journal 2008; 94:4957-4970.
Heintzmann, R., et al.; "Super-Resolution Structured Illumination Microscopy"; Chemical Reviews 2017; 117(23):13890-13908.
Ströhl, F., et al.; "Frontiers in structured illumination microscopy"; Optica 2016; 3(6):667-677.
Schermelleh, F., et al.; "Super-resolution microscopy demystified"; Nature Cell Biology 2019; 21:72-84.
Heintzmann, R., et al.; "Saturated patterned excitation microscopy with two-dimensional excitation patterns"; Micron 2003; 34:283-291.
Schropp, M., et al.; "Two-dimensional structured illumination microscopy"; Journal of Microscopy 2014; 256(1):23-36.
Ingerman, E., et al.; "Signal, noise and resolution in linear and nonlinear structured-illumination microscopy"; Journal of Microscopy 2019; 273(1):3-25.
Guo, Y., et al.; "Visualizing Intracellular Organelle and Cytoskeletal Interactions at Nanoscale Resolution on Millisecond Timescales"; Cell 2018; 175:1430-1442.
Frohn, J. et al.; "True optical resolution beyond the Rayleigh limit achieved by standing wave illumination"; Proceedings of the National Academy of Sciences of the United States of America 2000; 97(13):7232-7236.
Siebenmorgen, A., et al.; "Introducing Lattice SIM for ZEISS Elyra 7—Structured Illumination Microscopy with a 3D Lattice for Live Cell Imaging"; https://asset-downloads.zeiss.com/catalogs/download/mic/39039cc1-1e0d-4fdc-81c9-9d3d28966c66/EN_WP_Introducing_Lattice_SIM_for_Elyra-7.pdf (2018); 1-7.
Zhang, Y., et al.; "Super-resolution algorithm based on Richardson-Lucy deconvolution for three-dimensional structured illumination microscopy"; J. Opt. Soc. Am. A 2019; 36:173-178.
Perez, V., et al.; "Optimal 2D-SIM reconstruction by two filtering steps with Richardson-Lucy deconvolution"; Scientific Reports 2016; 6:37149.
Sahl, S., et al.; "Comment on 'Extended-resolution structured illumination imaging of endocytic and cytoskeletal dynamics'"; Science 2016; 352(6285).
Li, D., et al.; "Response to Comment on 'Extended-resolution structured illumination imaging of endocytic and cytoskeletal dynamics'"; Science 2016; 352(6285).
Jin, L., et al.; "Deep learning enables structured illumination microscopy with low light levels and enhanced speed"; Nature Communications; 11(1):1934.
Cnossen, J., et al.; "Localization microscopy at doubled precision with patterned illumination." Nature Methods 2020; 17(1):59-63.
Li, D., et al.; "Extended-resolution structured illumination imaging of endocytic and cytoskeletal dynamics",; Science 2015; 349(6251).
Bv, S.; "Huygens Professional User Guide"; papers3://publication/uuid/7CCF1B64-BB04-41AE-B226-346E8D0F0CC9; 2010; Im; 1-134.
Chakrova, N., et al.; "Deconvolution methods for structured illumination microscopy"; Journal of the Optical Society of America A 2016; 33(7):B12.
Ströhl, F., et al.; "A joint Richardson-Lucy deconvolution algorithm for the reconstruction of multifocal structured illumination microscopy data"; Methods and Applications in Fluorescence 2015; 3(1); https://doi.org/10.1088/2050-6120/3/1/014002.
Pospíšil, J., et al.; "Imaging tissues and cells beyond the diffraction limit with structured illumination microscopy and Bayesian image reconstruction"; GigaScience 2018; 8(1):1-12; https://doi.org/10.1093/gigascience/giy126.
Cox, I.J., et al.; "Information capacity and resolution in an optical system"; J. Opt. Soc. Am. A 1986; 3(8):1152-1158.
Boyd, S., et al.; "Vectors, Matrices and Least Squares"; Introduction to applied linear algebra; Cambridge University Press 2018; 11:216-221.

* cited by examiner

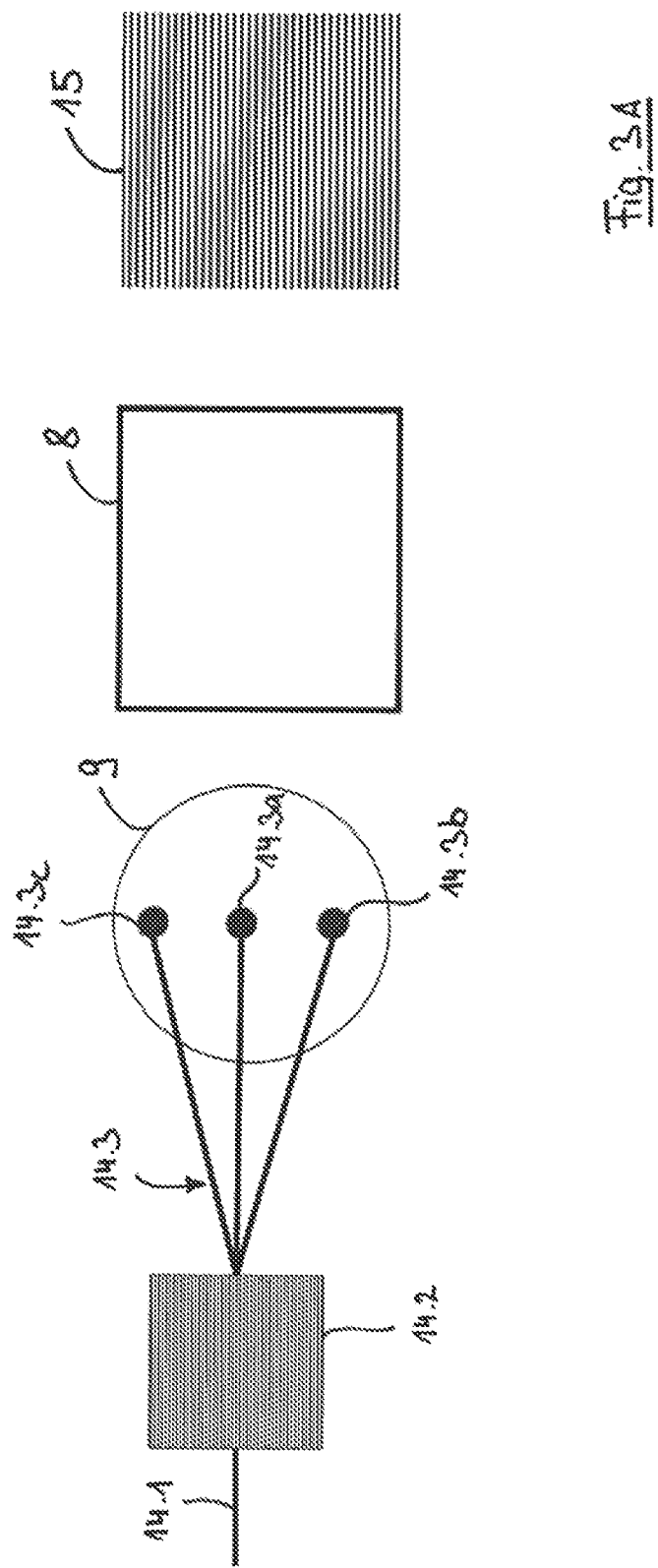

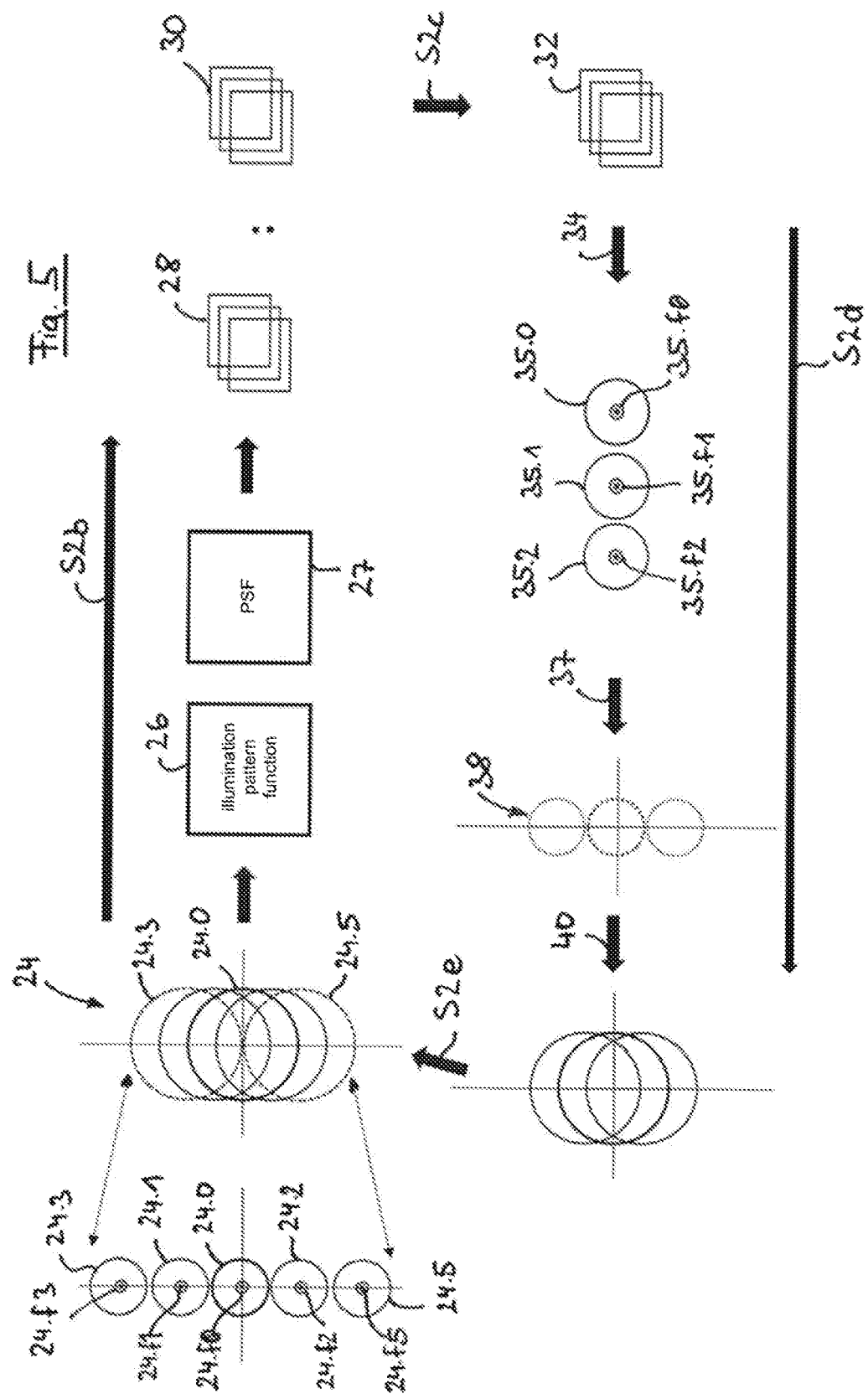

METHOD FOR SIM MICROSCOPY

RELATED APPLICATIONS

The present application claims priority benefit of German Application No. DE 10 2020 123 669.7 filed on Sep. 10, 2020, the contents of which are incorporated by reference in their entirety.

FIELD OF THE INVENTION

The invention relates to a method of image evaluation when performing SIM microscopy on a sample, and to an SIM microscopy method utilizing the corresponding image evaluation method.

BACKGROUND OF THE INVENTION

The so-called "structured illumination microscopy" technique has proven its worth as a microscopic imaging method. It can essentially be traced back to the publications [1] M. Neil et al.: "Method of obtaining optical sectioning by using structured light in a conventional microscope". Optics Letters 22, 1905-1907 (1997), https://doi.org/10.1364/OL.22.001905, and [2] M. Gustafsson et al.: "Three-Dimensional Resolution Doubling in Wide-Field Fluorescence Microscopy by Structured Illumination", Biophysical Journal 94, 4957-4970 (2008), and provides for an illumination of the sample using an SIM illumination pattern. The sample is imaged repeatedly with the illumination pattern being brought into various positions relative to the sample and a so-called raw image is obtained for each of the illumination states realized thus. These raw images are then combined in an image processing process in order to obtain an image of the sample that is improved in respect of the resolution, in particular in respect of the depth resolution, in relation to normal wide field imaging by the same microscope.

SIM illumination patterns are regular. The individually positioned SIM illumination patterns thus do not differ in their basic structure, which is identical in each case, but in terms of their relative position with respect to the sample during wide field imaging. The SIM illumination pattern is often generated from an initial beam by way of a grating which diffracts the initial beam into a plurality of orders of diffraction, which as partial beams capable of interfering with one another are arranged in an illumination pupil of an illumination beam path. Then, the SIM illumination pattern arises in the sample as an interference pattern. It contains a countable set of discrete spatial illumination pattern frequencies, with the number arising from the combination possibilities of the partial beams (cf. FIG. 2 in [2]). It is not unusual in this context to talk about orders of diffraction when the discrete, spatial illumination pattern frequencies in the frequency domain are meant. Nevertheless, the terminology in the specialist literature is sadly not uniform. The term order of diffraction is understandable if the (albeit only optional) generation of the illumination pattern by interference is considered since a diffraction effect occurs in this case. The spatial illumination pattern frequencies then correspond to the absolute value of the complex conjugate frequencies of orders of diffraction. However, the term order of diffraction has nothing to do with a (likewise optional) upstream generation of the partial beams by diffraction at a grating.

Without further measures, the SIM illumination pattern generated by interference immediately supplies a 3-D structured illumination since it is a Talbot pattern. 3-D imaging of the sample can be realized therewith.

A plurality of raw images are recorded at individually positioned SIM illumination patterns. The raw images contain a moiré pattern with the higher frequencies of the sample information. Consequently, a special image evaluation is required for the SIM microscopy technique in order to obtain the image of the sample from the moiré pattern of the raw images. The prior art considers the image evaluation, based on already existing raw images, in many different ways. In particular, the following publications should be mentioned:

[3] R. Heintzmann and T. Huser: "Super-Resolution Structured Illumination Microscopy", Chemical Reviews 17 (23), 13890-13908 (2017);

[4] F. Ströhl and C. Kaminski: "Frontiers in structured illumination microscopy". Optica 3, 667-677 (2016);

[5] L. Schermelleh et al.: "Super-resolution microscopy demystified", Nature Cell Biology 21, 72-84 (2019);

[6] R. Heintzmann: "Saturated patterned excitation microscopy with two-dimensional excitation patterns", Micron 34 (6-7), 283-291 (2003);

[7] M. Schropp and R. Uhl: "Two-dimensional structured illumination microscopy, Journal of Microscopy 256, 23-36 (2014);

[8] E. Ingerman et al.: "Signal, noise and resolution in linear and nonlinear structured-illumination microscopy", Journal of Microscopy 273, 3-25 (2019);

[9] Y. Guo et al.: "Visualizing Intracellular Organelle and Cytoskeletal Interactions at Nanoscale Resolution on Millisecond Timescales", Cell 175, 1430-1442;

[10] J. Frohn et al.: "True optical resolution beyond the Rayleigh limit achieved by standing wave illumination", Proceedings of the National Academy of Sciences of the United States of America 97, 7232-7236 (2000):

[11] A. Siebenmorgen and Y. Novikau: "Introducing Lattice SIM for ZEISS Elyra 7—Structured Illumination Microscopy with a 3D Lattice for Live Cell Imaging", https://asset-downloads.zeiss.com/catalogs/download/mic/39039cc1-1e0d-4 fdc-81c9-9d3d28966c66/EN_WP_Introducing_Lattice_SIM_for_Elyra-7.pdf, (2018), 1-7;

[12] WO 2013/049646 A1;

[13] DE 102018009056 A1:

[14] Y. Zhang et al.: "Super-resolution algorithm based on Richardson-Lucy deconvolution for three-dimensional structured illumination microscopy", J. Opt. Soc. Am. A 36, 173-178 (2019);

[15] V. Perez et al. "Optimal 2D-SIM reconstruction by two filtering steps with Richardson-Lucy deconvolution", Sci Rep 6, 37149 (2016):

[16] S. Sahl et al: "Comment on 'Extended-resolution structured illumination imaging of endocytic and cytoskeletal dynamics'", Science (80), 352, 527 (2016);

[17] D. Li and E Betzig: "Response to Comment on 'Extended-resolution structured illumination imaging of endocytic and cytoskeletal dynamics'". Science (80), 352, 527 (2016);

[18] L. Jin et al.: "Deep learning enables structured illumination microscopy with low light levels and enhanced speed", Nature Communications, 11(1), 1934;

[19] J. Cnossen et al.: "Localization microscopy at doubled precision with patterned illumination." Nature Methods, 17(1), 59-63, 2020;

[20] D. Li et al.: "Extended-resolution structured illumination imaging of endocytic and cytoskeletal dynamics", Science, 349(6251), 2015;

[21] S. By (2010): "Huygens Professional User Guide", Im, 1-134, papers3://publication/uuid/7CCF1B64-BB04-41AE-B226-346E8D0F0CC9;

[22] N. Chakrova et al.: "Deconvolution methods for structured illumination microscopy", Journal of the Optical Society of America A, 33(7), B12 (2016);

[23] F. Ströhl et al.: "A joint Richardson-Lucy deconvolution algorithm for the reconstruction of multifocal structured illumination microscopy data", Methods and Applications in Fluorescence, 3(1), https://doi.org/10.1088/2050-6120/3/1/014002, (2015);

[24] J. Pospíšil et al.: "Imaging tissues and cells beyond the diffraction limit with structured illumination microscopy and Bayesian image reconstruction", GigaScience, 8(1), 1-12, https://doi.org/10.1093/gigascience/giy126, (2018);

[25] I. J. Cox et al.: "Information capacity and resolution in an optical system", J. Opt. Soc. Am. A3, 1152-1158.

Conventionally (cf. [2]), the following steps No. 1 to 5 are carried out algorithmically for image evaluation of the raw images:

1. Extracting the frequency ranges containing sample information. To this end, the moiré pattern present in the raw images is decoded by solving a linear system of equations in the frequency domain.
2. Determining the phase angle and spatial illumination pattern frequencies from the raw images to minimize artifacts from the combination by calculation.
3. Filtering the frequency for suppressing spatial illumination pattern frequencies and, in particular, partly significant and low-frequency background which reaches higher frequencies as a result of a shift and leads to artifacts in the sample there.
4. Shifting the regions extracted in the first step to the corresponding positions in the frequency domain in order to be able to put together the high-resolution image. This is implemented by:
5. Combining the regions in a common step which contains the following:
   a. A weighted summation with
      i. weights of the illumination which originate from different illumination intensity levels of the individual illumination pattern frequencies and
      ii. weights derived from the optical transfer function (OTF),
   b. Use of a generalized Wiener filter to smooth the composition, in particular at the inner edges of the frequency bands,
   c. Utilization of an apodization function to suppress ringing artifacts produced by the Wiener filter.

The apodization function usually is adjustable in empirical fashion in order to improve the image evaluation during the reconstruction and avoid artifacts. Therefore, the SIM image evaluation also depends substantially on the utilized apodization function and the interpretation of the images is sometimes very contentious (see, e.g., [16], [17]).

In addition to this conventional reconstruction process and sub-variants thereof, further processes, some of which are also fundamentally different, for reconstructing SIM raw images have been published in recent years ([14], [15], [22]-[24]). They replace the Wiener filter utilized in No. 5b with iterative deconvolutions to minimize artifacts. Richardson-Lucy iteration methods and maximum likelihood estimation methods have been proposed.

Another, likewise completely different reconstruction method draws on the use of neural networks with so-called deep learning (cf. [18]). However, in principle, this method is an interpretation of the measured data, which feeds from "experiences" which the network has made with the training data records, i.e., already interpreted data records. However, this is hardly possible for scientific measurement since an already interpreted data record is usually not available or the transferability to other measurements is questionable.

The SIM technique requires a certain number of raw images for reconstructing the high-resolution image. Each raw image corresponds to individual positioning of the SIM illumination pattern. To the extent that the number of raw images is referred to below, this therefore automatically also applies to the number of individual positions of the SIM illumination pattern—and vice versa.

In the case of an illumination with a strip pattern, five positions in the form of displacement positions are usually required to reconstruct a high-resolution image [2]. As a result, the resolution is increased transversely to the strip direction. According to the prior art, at least as many displacement positions, and hence raw images, are required as diffraction orders that form the basis for the illumination pattern and that need to be separated in the Fourier domain (Gustafsson et al. [2]). To attain an isotropic increase in resolution, the five displacement positions are additionally combined with three alignments of the strip pattern; thus, 15 recordings are made.

The rule that the number of orders of diffraction specifies the number of displacement positions for the SIM illumination pattern also applies when multidimensional SIM illumination patterns, so-called multi-spot SIM illumination patterns, are used. However, rotations of the multi-spot SIM illumination pattern are no longer required in this case. By contrast, the number of orders of diffraction is higher, specifically at least 13. Thus, 13 displacement positions and raw images are required. The multi-spot SIM illumination pattern can be reduced to the 2-D case (referred to as 2-D SIM), for example by blocking the zero order of diffraction in the illumination beam path, leading to the loss of modulation in the axial direction and hence to the reduction from 3-D to 2-D. Then, nine raw images are required since the number of orders in the illumination pattern to be separated has been reduced. The same also applies to the combination of TIRF microscopy with 2-D SIM. The zero order of diffraction is not present there either, specifically on account of the TIRF illumination. GI SIM, a 2-D SIM variant, likewise works with TIRF illumination. GI represents grazing incidence and expresses that the angle of incidence of the illumination light at the coverslip is set so that the TIRF condition is only just satisfied and, at the same time, the illuminated layer at the coverslip has been broadened, e.g., to 1 µm instead of 100 nm like in the "conventional" TIRF.

Heintzmann [6] analyzed the number of raw images required and ascertained an optimization of the minimum number of raw images required to obtain the high-resolution image on the basis of the raw images with all orders of diffraction being taken into account. He proposed to reduce redundancies such that the number of raw images required for reconstruction on the basis of all orders of diffraction is minimized.

A variant for the possible reduction in the number of images to be recorded when recording 3-D image stacks is disclosed in [13]. This does not relate to the displacement positions and alignments of the raw images but instead relates to recording a z-stack, and the number of z-positions for recording the image stack is minimized. The reduction in the number arises from the use of larger z-increments, which is ensured by a redundancy in z-image information in the individual raw images with different z-positions.

The number of raw images required restricts the recording rate. More raw images require more time. Moreover, the number of raw images required reduces the number of possible high-resolution images of a biological sample, i.e., the possible repetitions of the microscopy process, since each exposure generates photodamage and the overall number of exposures until the sample has been damaged to a bothersome extent is therefore limited.

The invention is therefore based on the object of reducing the number of raw images required for SIM microscopy.

SUMMARY OF THE INVENTION

The invention is defined in the independent claims. The dependent claims relate to preferred configurations.

The invention specifies a method for performing SIM microscopy on a sample. The method comprises the step of generating n raw images of the sample. Each raw image is generated by illuminating the sample using the same SIM illumination pattern. However, the SIM illumination pattern is positioned individually for each raw image, to be precise in shifted fashion. Consequently, the same (basic) illumination pattern is used to record one raw image in each of the different displacement positions. Consequently, there are n different positions of the same SIM illumination pattern. A rotation can be added, but remains unconsidered here for the specification n. The SIM illumination pattern is assigned p orders of diffraction. In a subsequent step, an image of the sample is generated from the n raw images, wherein an image reconstruction is carried out using the orders of diffraction. However, not all of the available orders of diffraction are used for the image reconstruction in this case. In the method, t highest orders of diffraction are suppressed. In this case n=p−t, still applies, i.e., the t highest orders of diffraction not used or suppressed lead to fewer raw images having to be recorded, by exactly this amount, than the number of the orders of diffraction on which the SIM illumination pattern is based. Consequently, as a result of dispensing with the t highest orders of diffraction during the image reconstruction by way of suppression, the method makes do with a fewer number of raw images than needed in the prior art. The reduction in the number of raw images corresponds to the number of suppressed highest orders of diffraction.

The term "highest order of diffraction" does not in this case relate to the ordinal number (0th, 1st or 2nd, etc.) of the orders of diffraction but to the frequencies of the orders of diffraction. This will be explained in more detail in the following description of the figures.

The orders of diffraction correspond to spatial frequencies of the illumination pattern. From a signaling point of view, the spatial frequencies of the illumination pattern serve in SIM microscopy as carrier frequencies on which the SIM microscopy modulates the frequency spectrum representing the sample information. As a result, the SIM technology can image a frequency spectrum of the sample (and ultimately a resolution) by the optical unit, which is actually located outside of the range transmissible by said optical unit. This frequency spectrum is separated from the plurality of carrier frequencies again using the method for image reconstruction.

The expression suppression of the orders of diffraction comprises the orders of diffraction being deliberately attenuated, for example by filtering. However, it also comprises the image reconstruction being carried out as if these orders of diffraction were not even present. In that case they are also suppressed in the image reconstruction since their information content or their action as a carrier frequency does not come to bear. Expressed differently, the method dispenses with the contribution of the t highest orders of diffraction in the image reconstruction.

In the method, there is a reduction in the orders to be separated in the frequency domain, which is usually also referred to as Fourier domain. However, it should be emphasized that the orders of diffraction, and hence the actual orders to be separated in the SIM illumination pattern, by means of which the sample was illuminated for the purposes of recording the raw images, are by all means present in the raw images. However, the number of raw images is reduced by the number of orders of diffraction suppressed during the image reconstruction, and so fewer raw images are required overall.

In principle, the suppression can be implemented in two ways:
1. The highest orders of diffraction are suppressed during the image reconstruction. e.g., by filtering.
2. An extrapolation or an approximation method is carried out or nonlinear iterative methods, which will still be explained below, are used so as not to use the highest orders of diffraction for the image reconstruction.

It is therefore possible to very easily dispense with the contribution of the highest orders of diffraction because, although these orders of diffraction correspond to high modulation frequencies which carry the sample spectrum after the interaction with the sample, the inventors have recognized that these can be suppressed with surprisingly few losses during the image reduction since they only make a minor contribution on account of the weak intensity.

This can be amplified by virtue of the t highest orders of diffraction being attenuated in terms of their intensity when optically generating the SIM illumination pattern. A particularly simple realization for this consists in a pattern of illumination light points being generated in an illumination objective pupil for the purposes of providing the SIM illumination pattern. To attenuate the t highest orders of diffraction, it is ensured that the light points located furthest away from the center are located on at least 800% of the diameter of the illumination objective pupil. This markedly reduces the intensity of the highest orders of diffraction. Consequently, they are located in the frequency domain at at least 80% of the highest illumination frequency, i.e., cover a very high frequency range of the carrier frequencies.

Preferably, the light points furthest away from the center are located in the range from 90% to 95% of the diameter. A range from 80% to 85% is further preferred and a range from 85% to 90% is particularly preferred. These ranges are chosen in this way because, firstly, the general transmission collapses beyond the 95%. This applies in particular to signal strengths used for biological living samples. Secondly, the polarization plays an increasing role in the case of objectives with a high NA and the modulation contrast of the structuring reduces as a result of the input coupling at a distance from the center and the corresponding high angles with which the radiation is then focused into the sample. The preferred sequence of the ranges above yields an optimal trade-off of these effects.

The suppression of the t highest orders of diffraction can preferably be implemented by a filtering step in the frequency domain.

The suppression is easily possible from a computation point of view if an iterative Richardson-Lucy iteration method is used and if, in the simulation part thereof, the t highest orders of diffraction are not used in the generation of the simulated raw images by virtue of the terms thereof being omitted. Hence, the part of the moiré pattern caused by the highest orders of diffraction, which is by all means present in the recorded raw images, is assigned to the sample spectrum or the background noise as a result. This does not cause an inadmissible error on account of the small contribution made by the highest orders of diffraction. This applies very particularly if the intensity of the highest orders of diffraction has been attenuated by the aforementioned measures. Possible artifacts that might arise are optionally additionally reduced by virtue of a filtering step which additionally attenuates or suppresses the highest orders of diffraction being carried out after the simulation part in the iteration loop. This filtering step is then carried out in the frequency domain. Alternatively, this filtering can also be used for the suppression of the orders of diffraction in the simulation part. The simulation is then implemented with all orders of diffraction present in the SIM illumination pattern, but naturally again only for n raw images. The filtering after the simulation part, i.e., after the comparison of simulated raw images and recorded raw images, then suppresses the orders of diffraction. They are easily accessible for filtering in the frequency domain.

The suppression of the highest orders of diffraction is also possible in the case of the conventional reconstruction, for example as described by Gustafsson et al. [2]. In this case there are alternatives. In a first variant, a system of equations for extracting the information contained in the moiré pattern, which only contains n equations, is set up in step No. 1 of the conventional reconstruction (see above). As a result, the t=p−n highest orders of diffraction are automatically not taken into account. This system of equations can be solved on account of the n recorded raw images present. In the second alternative, the system of equations is set up with p equations. It is underdetermined on account of the n=p−t raw images available. This system of equations is then solved using an approximation method or an extrapolation method, which ascertains a solution on the basis of the n raw images from the (n+t) equations. Known tools come into question in this respect, as are known to a person skilled in the art, for example from the textbook S. Boyd, L. Vandenberghe, "Introduction to applied linear algebra", Chapter 11, p. 216, ISBN 978-1-31651-896-0, Cambridge University Press, 2018, https://doi.org/10.1017/9781108583664. One example is singular value decomposition. Another example is a nonlinear iterative method. In both cases, it is preferable to use similarities of the illumination frequencies modulated by the same object and/or continuity and/or positivity of the sought-after object spectrum as boundary conditions in order to restrict the solution space and in order to carry out the extrapolation or the approximation method.

The SIM microscopy method which suppresses the highest orders of diffraction reduces the number of raw images required to n displacement positions. Using strip pattern illumination, 3n raw images are recorded as a result on account of the three rotations required for an isotropic resolution. Hence, a total of nine raw images is required in the case of a reduction by the two highest orders of diffraction. In the case of a multi-point SIM illumination pattern, which contains 13 instead of five orders of diffraction, the invention reduces the number of raw images to nine if the four highest orders of diffraction remain unconsidered, i.e., are suppressed. There is no need here for a rotation of the multi-point SIM illumination pattern, and so, overall, the number of raw images is the same as in the case of the strip-shaped illumination pattern.

A combination with the features as per DE 102018009056 A1 (corresponding to citation [13]) is particularly preferred for the SIM microscopy method presented here, since a z-stack of high-resolution images is obtained in that case without a greater number of raw images being required in relation to conventional microscopy. Hence, the depth resolution and improved lateral resolution are obtained as it were "for free" in respect of the number of raw images.

It goes without saying that the features mentioned above and those yet to be explained below can be used not only in the combinations specified but also in other combinations or on their own, without departing from the scope of the present invention.

The invention will be explained in even more detail below on the basis of exemplary embodiments, with reference being made to the appended drawings, which likewise disclose features essential to the invention. These exemplary embodiments are only illustrative and should not be construed as restrictive. By way of example, a description of an exemplary embodiment with a multiplicity of elements or components should not be construed as meaning that all of these elements or components are necessary for implementation. Rather, other exemplary embodiments can also contain alternative elements and components, fewer elements or components, or additional elements or components. Elements or components of different exemplary embodiments can be combined with one another, unless stated otherwise. Modifications and variations which are described for one of the exemplary embodiments can also be applicable to other exemplary embodiments. In order to avoid repetition, the same elements or corresponding elements in different figures are denoted by the same reference signs and are not explained a number of times.

BRIEF DESCRIPTION OF THE DRAWINGS

In the figures:

FIG. 3B is a schematic illustration of light points in an illumination pupil for generating an SIM illumination pattern constructed from multi-spots, FIG. 5 is a schematic illustration for elucidating an iteration method which is used in the image evaluation method as per FIG. 1.

DETAILED DESCRIPTION OF THE EMBODIMENTS

Figure 1:
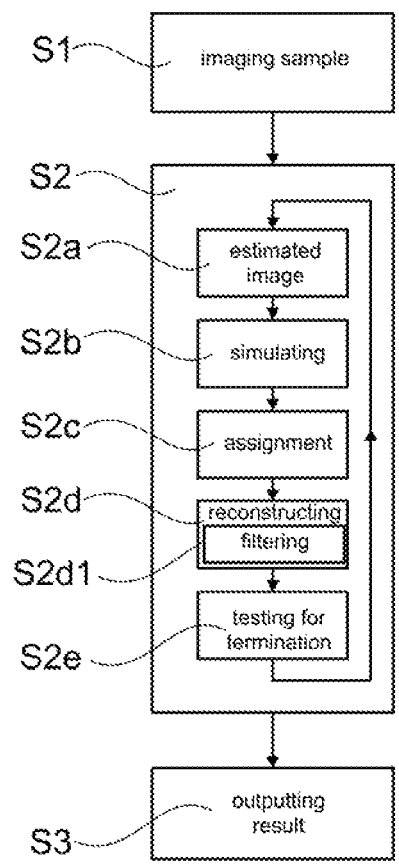
FIG. 1 is an illustration in a block diagram of an embodiment of a method for SIM microscopy.

FIG. 1 shows, as a block diagram, an image evaluation method for raw images, as arise in SIM microscopy for example. The method substantially comprises three steps S1-S3, of which step S2 is a step in which a high-resolution image is generated by means of an iteration method.

The sample is imaged multiple times in step S1, said sample being illuminated by an illumination pattern as known in SIM technology. The raw images differ in respect of the displacement position and/or alignment of the illumination pattern, as is likewise conventional for SIM microscopy. A number of raw images that equals the number of positions of the illumination pattern arises, in each case by imaging the sample by means of a point spread function (PSF). Consequently, n raw images are available at the end of step S1, as typically arise in SIM microscopy. Each of the raw images is an image representation of one and the same sample, which is illuminated by the illumination pattern. The raw images differ to the effect of how the illumination pattern is individually positioned. The individual position is specified in each case by an illumination pattern function, which defines or reproduces the individual relative position and/or alignment of the illumination pattern. In this case, the specification n refers to the number of displacement positions of the illumination pattern.

The illumination pattern has illumination pattern frequencies, which arise from the generation of the illumination pattern by interference, for example. If reference is made to this type of generation, the illumination pattern frequencies can also be understood to be p orders of diffraction. This interpretation is usual and expedient, even if the generation was implemented differently. The frequencies of the p orders of diffraction correspond to spatial illumination pattern frequencies, albeit under the consideration that the orders of diffraction are complex conjugate variables in the frequency domain. Thus, above the fundamental frequency, which is a common mode component, there always are pairs of two orders of diffraction of equal absolute value in the frequency domain for each of the illumination pattern frequencies defined in the spatial domain. This is vividly illustrated in FIG. 2 of publication [2].

In this case, for the sake of simplicity, the consideration below is restricted to the one-dimensional case, i.e., the generation of the raw images as pure phase images, i.e., in a fixed rotational position of the strip pattern. Then, the resolution is increased transversely to the strip direction. As a person skilled in the art is aware, an isotropic increase can be achieved by using, e.g., three rotational positions per displacement position. Although the image reconstruction or image evaluation of the raw images is computationally more complex, it follows completely the principles explained here for the one-dimensional case.

Each of the n raw images is assigned exactly one of the n illumination pattern functions, which specify the shift as a phase, for example. Therefore, the raw images are also referred to as phase images if the intended emphasis is that the differences lie in the displacement but not in a rotational position. Now, an iteration method comprising steps S2a, S2b, S2c, S2d and S2e is carried out in step S2 using the n raw images (i.e., phase images) generated in step S1, the n illumination pattern functions and the PSF. In the present exemplary embodiment, the iteration method is image processing which carries out a Richardson-Lucy iteration. To this end, firstly an estimated image of the sample is provided or generated in an iteration step S2a. This estimated image of the sample is continuously improved during the iteration method and represents the image of the sample at the end. A uniform grayscale image can be provided in S2a for a first iteration through the iteration loop S2a-S2e.

Subsequently, a simulation generating n simulated raw images is carried out in an iteration step S2b using the PSF and the n illumination pattern functions. The number of raw images corresponds to the number of illumination pattern functions, i.e., the number of individual displacement positions which the illumination pattern had in the provided n raw images since each illumination pattern function describes exactly one of the utilized displacement positions—within the meaning of phases of the relative position of the illumination pattern. However, this number is smaller (see below) than the number p of orders of diffraction in the SIM illumination pattern. The t highest orders of diffraction present in the illumination pattern functions are not used in the simulation. To this end, the corresponding terms of the function are simply omitted in the simulation calculation so that the highest orders of diffraction are suppressed. In this case, it is particularly preferable for the filtering, which is explained below in view of a partial step S2d1, to be additionally carried out since, of course, the recorded raw images by all means contain the higher orders of diffraction.

Alternatively, the highest orders of diffraction are used in the simulation and the corresponding terms of the illumination pattern function are not omitted in the Fourier domain. Then, the filtering of the partial step S2d1 is obligatory.

If the terms of the highest orders of diffraction are not used in the simulation, the components in the recorded raw images which were generated on account of the illumination with the highest orders of diffraction, which are of course actually present in the illumination pattern, are not taken into account in the image reconstruction. Thus, they act as if they were a constituent part of the sample information or background noise. This is corrected by the filtering as per partial step S2d1. In particular, it can also be implemented as high-pass filtering since the highest orders of diffraction contain particularly high frequency components.

In a step S2c, there is a one-to-one assignment of the simulated raw images to the provided raw images, with the assignment being implemented on the basis of the illumination pattern functions. Thus, each of the n simulated raw images is assigned to exactly that one of the recorded n raw images which has the same displacement position. In this way, n pairs of simulated and recorded raw images arise, wherein each pair was generated on the basis of the same illumination pattern function—the provided raw image in the actual imaging, the recorded raw image in the simulated imaging. After this assignment, a comparison is carried out within the pairs, i.e., in each case between assigned simulated raw image and recorded raw image, in step S2c. By way of example, this comparison can be the formation of a ratio such that the intensity ratio is formed for each pixel of the recorded raw image and of the associated simulated raw image (naturally, the simulation of the raw images is implemented on the basis of a compatible pixel basis to the pixels of the image recording process; ideally, the pixel bases are identical). In this way, correction raw images are obtained at the end of the step S2c—there is a correction raw image for each of the illumination pattern functions. Each correction raw image specifies the deviation between the simulated raw image and recorded raw image for the respective phase angle of the illumination pattern.

The image of the sample is reconstructed from the correction raw images in a step S2d. Here, filtering which additionally attenuates or suppresses signal components corresponding to the t highest orders of diffraction of the illumination pattern is carried out in partial step S2d. Preferably, Gaussian notch filtering is carried out in embodiments. Here, t=p−n applies to t. This filtering can be carried out in complementary fashion or as a replacement, as already explained in respect of the simulation.

The result of the reconstruction of step S2d is a correction image which reproduces the deviation between the estimated image of step S2a. Therefore, the estimated image is updated using the correction image and this updated estimated image is then used in the next iteration in step S2a.

In the individual iterations, there can be variations in respect of the use of the highest orders of diffraction in the simulation and the filtering in partial step S2d1. By way of example, it is thus possible to not use the highest orders of diffraction in the simulation in a first iteration and, for example, not carry out the filtering in partial step S2d1 and use the highest orders of diffraction in a second iteration and, by contrast, carry out the filtering in partial step S2d1.

The iteration method of step S2 is terminated according to various criteria. Possible criteria include reaching a maximum number of iterations or dropping below a correction threshold in the correction image in step S2e, i.e., if the update to be undertaken for the next iteration drops below a minimum threshold. The latter is an indication for the iteration method having converged sufficiently.

As a result, the last-obtained estimated image, which is then no longer used for the iteration since the iteration method was terminated, is output as a result in step S3. It represents a high-resolution image of the sample, which was obtained despite the number of raw images being smaller than the number of orders of diffraction in the illumination pattern.

The explanations provided until now must not be misunderstood to the effect of the value for n only being known after the image evaluation. Rather, it is determined following the design of the system since the image evaluation algorithm to be applied already stands before the generation of the raw images. Hence, t is also determined. Equally, the number of orders of diffraction p is determined on account of the type of provision of the SIM illumination pattern. Consequently, the value for n is also known before the microscopy is carried out. Rather, the relationship n=p−t should elucidate how the corresponding values are related to one another.

Instead of the Richardson-Lucy iteration method described with reference to FIG. 1, use can equally also be made of a deconvolution using a Wiener filter, as described in [2], for example, and as is already mentioned above with the steps No. 1 to No. 5 for the image evaluation of the raw images. In this case, step No. 1 is modified. The raw images represent a moiré pattern which contains both the frequencies on account of the orders of diffraction of the illumination pattern (also referred to as carrier frequencies above) and the sample information modulated thereon. The frequencies contained in the moiré pattern are extracted in step No. 1. To this end, a system of equations is set up and solved. This is implemented in the frequency domain. The suppression of the highest orders of diffraction is now implemented in step No. 1, for the purposes of which there are two alternatives:

The system of equations is set up in such a way in a first alternative that it contains n equations, even though the moiré pattern is based on n+t=p frequencies on account of orders of diffraction. This n-fold system of equations can be solved on account of the n raw images present. The solutions contain the frequencies of the t highest orders of diffraction, mixed up as it were. This can either be tolerated, for example if the highest orders of diffraction are weakly pronounced, optionally because additional care is taken that these only have a low intensity, or an additional filtering step is undertaken in order to suppress, i.e., attenuate or entirely eliminate, the frequency components corresponding to the highest orders of diffraction.

In a second alternative, the system of equations consisting of p equations is set up. It is underdetermined since only n raw images are available for the solution. The solution is therefore implemented approximately or by extrapolation, as a result of which the t highest orders of diffraction are automatically not taken into account. To this end, known approximation methods or extrapolation methods can come into question (see above). In particular, singular value decomposition can be used. Unlike in the first alternative, the highest orders of diffraction are not expressly suppressed; however, they are no longer taken into account as a result of the approximating or extrapolating solution, which likewise is a form of suppression (see above in the general part of the description).

Figure 2:
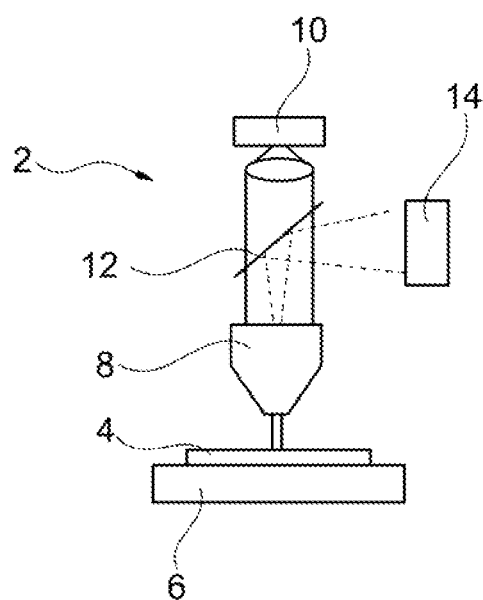
FIG. 2 illustrates a microscope that can be used for generating raw images which are evaluated in the method as per FIG. 1.

FIG. 2 schematically shows a microscope 2, as can be used to provide the raw images. The microscope 2 images a sample 4 which is located on a sample carrier 6. The imaging is implemented by means of an objective 8, which images the sample on a detector 10 by means of a tube lens not denoted in any more detail. By way of a beam splitter 12, an illumination device 14 illuminates the sample 4 through the objective 8 in such a way that structured illumination which is adjustable in terms of relative position and/or alignment is implemented, as known to a person skilled in the art for SIM technology.

Figure 3A:
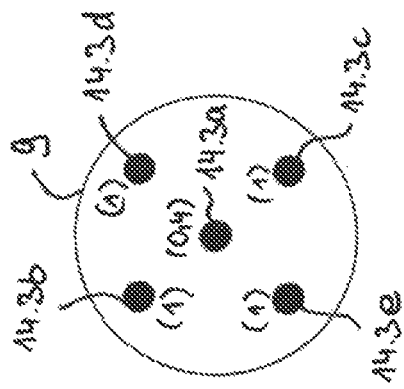
FIG. 3A is a schematic illustration of an illumination device of the microscope of FIG. 2.

An example of the realization of the illumination is shown in FIG. 3A. The illumination device 14 provides an origin beam 14.1, for example from a laser (not illustrated in any more detail). With the aid of a grating 14.2, this origin beam 14.1 is decomposed into three partial beams 14.3, which are optically shaped by suitable lenses or other optical elements (not illustrated in any more detail) so that three adjacent light points, with a central point 14.3a for the central partial beam and two adjacent points 14.3b and 14.3c for the lateral partial beams, arise in an entry pupil 9 (which is also referred to as back focal plane) of objective 8. The three points in the objective pupil 9 lead to a strip-shaped SIM illumination pattern 15 arising in the sample as a result of interference. This illumination pattern 15 is only shown in a plan view in FIG. 3A, i.e., rotated through 90°; the same applies to the objective pupil 9 and the points 14.3a-14.3c. In fact, the illumination pattern 15 generated is a Talbot pattern which is embodied as a strip pattern not only in the xy-plane, in which it is shown in FIG. 3A, but also perpendicular thereto, i.e., along the depth extent of the sample 4.

The points can also be generated differently, for example by optical fibers that end in the pupil or suitably arranged tilt mirror matrices. Nor is the number restricted to three (see below).

The generation of the illumination pattern 15 by interference shown in FIG. 3A is exemplary, but it has formed for historical reasons as the usual way of considering things, in which the various discrete frequencies present in the illumination pattern 15 are referred to as orders of diffraction. As already explained, these are carrier frequencies from a signaling point of view. Above the fundamental frequency/zero order of diffraction, the orders of diffraction correspond to spatial illumination pattern frequencies, albeit as complex conjugate variables, and so there always are pairs of two orders of diffraction of equal absolute value present above the fundamental frequency. By way of example, the strip-shaped SIM diffraction pattern has three spatial frequencies, a fundamental frequency and a first and a second higher spatial frequency. The fundamental frequency corresponds to a zero order of diffraction. There are additionally four further orders of diffraction, two first and two second. The absolute value of the two first orders of diffraction in each case corresponds to the first higher spatial frequency; the absolute value of the two second orders of diffraction in each case corresponds to the second higher spatial frequency.

In the embodiment of FIG. 3A, p=5, n=3, t=2 applies. This example can vividly explain the understanding which forms the basis for the term "highest order of diffraction" in this description. The ±2 orders of diffraction are two highest orders of diffraction according to the underlying understanding of the term in this case. If the emphasis were only on the ordinal number, there would naturally only be one uppermost order of diffraction. However, in this case, the highest order of diffraction is understood to mean the orders of diffraction with the highest frequencies in terms of absolute value. In the case of t=2, these are the +2nd order of diffraction and the −2nd order of diffraction. Thus, as a result, the term highest orders of diffraction focuses on the highest spatial frequencies according to absolute value which contribute to the illumination pattern in the frequency representation. It is naturally not only the highest frequencies that come into question, but also the second highest or third highest, etc.

The t=2 highest orders of diffraction arise in the generation as per FIG. 3A by way of interference of the radiation from the light points 14.3c and 14.3b, i.e., without involvement of the central beam 14.3a. To simplify the suppression or non-consideration of the highest orders of diffraction or to reduce artifacts in the image reconstruction, care is taken that the light points 14.3b and 14.3c distant from the center are located on at least 80% of the pupil diameter. In this way, the intensity of the highest orders of diffraction is reduced, as a result of which they can more easily be removed by filtering or the non-consideration thereof has a reduced risk of artifacts arising.

Figure 3C:
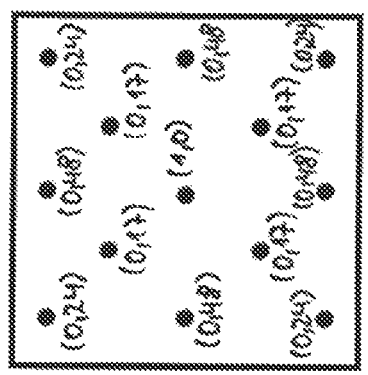
FIG. 3C shows illumination intensities in the Fourier domain, obtained by the light points as per FIG. 3B.
Figure 3D:
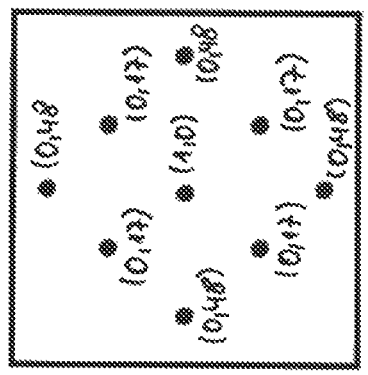
FIG. 3D is an illustration of the illumination intensities in the Fourier domain, which are used in the image reconstruction.

FIG. 3B relates to the case of an SIM illumination pattern which is embodied not as a strip pattern 15 but as a multi-point pattern, i.e., as a regular arrangement of luminous points in the focal plane, and which is moreover formed as a Talbot pattern. To this end, four luminous points 14.3a to 14.3d, for example, are arranged in the illumination pupil 9. The values written in parentheses next to the illumination points specify the relative illumination intensity. Such a pattern of light points in the illumination pupil 9 moreover leads to the pattern of the illumination intensities in the Fourier domain shown in FIG. 3C. The values between parentheses once again denote the relative illumination intensity of the individual orders of diffraction. Each point corresponds to an order of diffraction. The further a point is away from the center, the higher the order of diffraction. It is evident that the intensity of the four orders of diffraction located in the corners is only 0.24. On account of the distance from the center, these are the four highest orders of diffraction. These are not taken into account or are suppressed in the image evaluation, and so effectively only the orders of diffraction as per FIG. 3D become effective as a result of the image reconstruction. Instead of 13 orders of diffraction and, accordingly, 13 raw images, only nine orders of diffraction are taken into account in the image reconstruction, as a result of which only nine raw images are required as well. Thus, n=9, p=13, t=4 applies in this exemplary embodiment. Unlike in the strip pattern no rotation is required here. Displacement positions are enough. It is once again evident from this example that the term highest orders of diffraction does not target the highest ordinal number of the orders of diffraction. Rather, this refers to the orders of diffraction with the highest frequencies. The four points with the intensities of 0.24 plotted in the frequency domain represent four highest orders of diffraction in the representation of FIG. 3C. However, there would be no advantage in suppressing only a subset, e.g., two or three, of the four frequencies of equal absolute value in FIG. 3C with the relative intensity of 0.24. It is therefore very generally preferred to choose the t higher orders of diffraction in such a way that they cover all frequencies of equal absolute value of the higher orders of diffraction to be suppressed, i.e., for example, all higher orders of diffraction with the intensity of 0.24 arising in FIG. 3C, and not only a subset thereof. Then, the suppression of the highest order(s) of diffraction includes all frequencies belonging to the same ordinal number of the order(s) of diffraction, i.e., have the same absolute value.

Other values for t are possible, particularly in the case of illumination patterns containing more than 13 orders of diffraction, for example as described in citation [7].

The embodiments operate with a reduced number of raw images in relation to the prior art by virtue of dispensing with the contributions of the highest carrier frequencies, i.e., the highest orders of diffraction. Here, this does not only mean the frequencies per se, but the contribution supplied as carrier frequencies, i.e., also the components of the sample information modulated thereon. Although these orders of diffraction or their corresponding modulation frequencies also carry sample spectral information, the amplitudes of these modulation frequencies tend to be weak; by way of example, they are only half of the next orders of diffraction that remain after the suppression. The same applies to the illumination. Moreover, these frequencies only have a weak effect in the raw images during the imaging as well since the optical PSF of the objective is only relatively low at these high frequencies as well; i.e., the sample information which is modulated on the highest orders of diffraction or the modulation frequencies thereof will only be transferred into the raw images to a very small proportion.

The raw images are generated by virtue of the sample being illuminated by the illumination pattern and the light reflected by the sample or the fluorescence-emitted light in the case of fluorescence excitation being registered. As will still be explained below on the basis of mathematical formalism in relation to FIG. 5, the image of the sample is a convolution of the illumination pattern function, the actual location information in the sample and the point spread function of the microscopic imaging.

Figure 4:
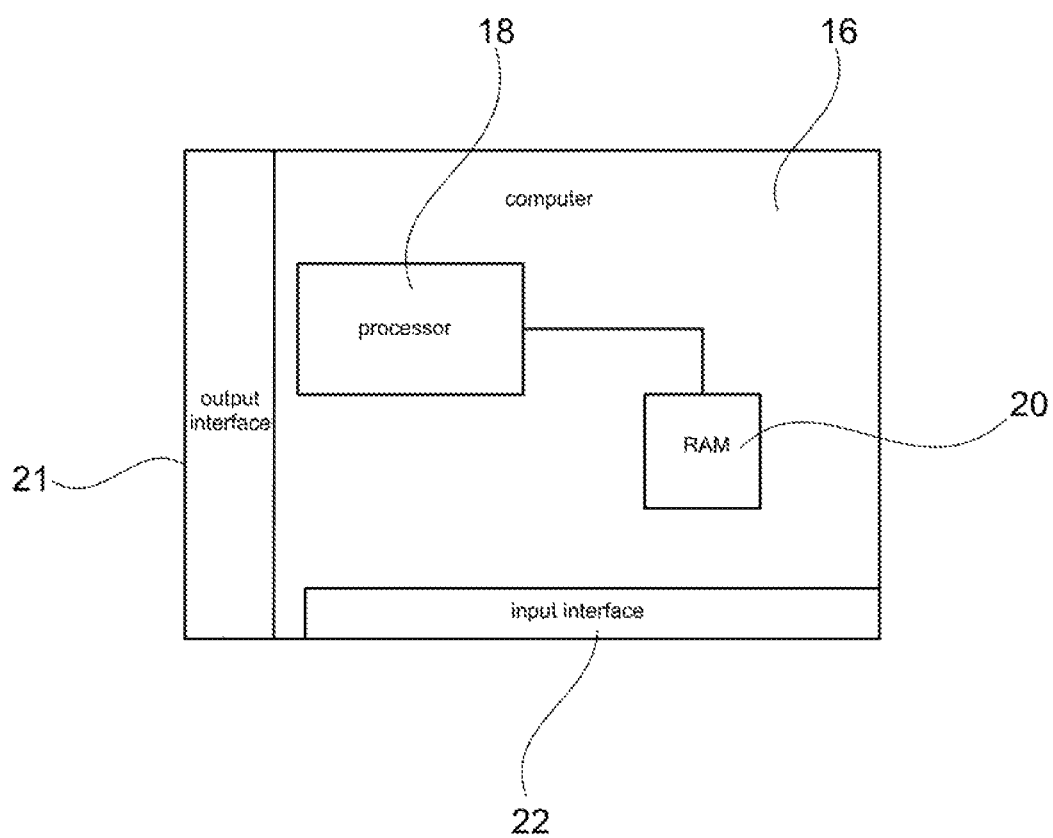
FIG. 4 is a schematic illustration of an image evaluation apparatus.

FIG. 4 schematically shows an apparatus, more particularly a computer 16, which is suitable for the image evaluation and which can be a constituent part of the microscope 2. The computer 16 comprises a processor 18 and RAM 20, in which a computer program is stored which issues commands to the processor 18 such that the latter ultimately carries out the method of steps S1-S3 as per FIG. 1. Here, the requisites, i.e., the PSF, the n raw images and the n illumination pattern functions are made available via an input interface 22 and the computer 16 outputs the reconstructed image of the sample interface 21. Optionally, the computer 16 calculates the n illumination functions in advance.

FIG. 5 schematically shows the procedure in the iteration method S2. The estimated image is denoted by 24. A simulation starts in step S2b, which generates the n simulated raw images 28—either with or without the t highest orders of diffraction of the illumination pattern being taken into account (see above)—using the n illumination pattern function 26 and the PSF 27. These simulated raw images are then compared to the n recorded raw images 30 such that the n correction raw images 32 are available at the end of the step S2c. In the illustration of FIG. 5, n=3 in exemplary fashion. The correction raw images 32 are then subjected to a deconvolution in step S2d, included in which are, once again, the PSF and the n illumination pattern function. The aforementioned filtering 37 takes place additionally or optionally (see above).

The individual iteration steps are plotted in the figure. The iteration method S2 is represented in the frequency domain in FIG. 5, in particular with regards to the symbolism of the estimated image 24, of the correction image 36 and of the individual stages of the deconvolution in the iteration step S2d. The estimated image 24 of the sample is shown in the frequency domain in FIG. 5 as a stack of circles strung together along the imaginary axis, the center of each circle corresponding to one of the carrier frequencies or orders of diffraction. The left illustration expands these circles stacked on one another by virtue of both their centers being pulled apart on the imaginary axis (the vertical axis) and the circle diameter being reduced for visualization purposes. Five frequency ranges 24.0 to 24.4 arise, which each carry image information of the sample. The relative position of their centers is specified by the orders of diffraction. Consequently, in the SIM microscopy illustrated here, five raw images corresponding to the five orders of diffraction are actually necessary if the conventional consideration according to the prior art is followed. This is symbolized by the expansion of the frequencies illustrated to the left. In fact however, work is carried out with fewer orders of diffraction for evaluation purposes, specifically it is the t highest orders of diffraction that are not taken into account. The image 24 obtained in the simulation therefore does not comprise the dashed highest frequency ranges, but is only based on n=3 orders of diffraction, i.e., t=2 fewer than the actual p=5 orders of diffraction present. Naturally, this reduction in the orders of diffraction plays no role in the first estimate of the image 24, which may be a non-structured grayscale image, for example, as is known for the Richardson-Lucy deconvolution. Rather, the non-consideration of the highest orders of diffraction is implemented by virtue of these orders of diffraction not being taken into account during the simulation of the simulated raw images and/or corresponding filtering being carried out in the return branch of the iteration (see above).

The frequency range 24.0 is the one able to be transmitted by the objective. In the illustration of FIG. 5, all centers of the circles are located in the image 24, i.e., the carrier frequencies of the frequency ranges of the sample information lie within this frequency range 24.0 which can be transmitted by the optical unit. However, this is no longer evident in the pulled-apart illustration to the left of image 24 since the circle diameter, as already mentioned, has been reduced.

The carrier frequencies, of which the lowest carrier frequency, i.e., the zero order of diffraction, of the regular SIM illumination pattern is denoted by 24.f0, are all located within the range transmittable by the imaging optical unit of the microscope. The image information, in the form of the above-described moiré pattern, is superposed on the carrier frequencies and needs to be suitably separated in the SIM image analysis and synthesized to form the image of the sample, as explained in the introductory part.

To this end, a simulation of the imaging of the sample with the different illumination states is generated initially in iteration step S2b. Illumination pattern functions 26 that simulate the illumination of the sample are used in this simulation. In one variant, the terms of the highest orders of diffraction are not taken into account in these illumination pattern functions such that, for the simulation in step S2a, only the n=p−t lowest orders of diffraction and not the t highest orders of diffraction are used. In an aforementioned alternative thereto, the terms of the highest orders of diffraction are taken into account, i.e., the t highest orders of diffraction are not (yet) suppressed (here). It is the case in both variants that n simulated raw images are generated.

The simulated raw images 28 obtained thus are compared to the measured raw images 30 and the comparison result in the form of correction raw images 32 is then converted back into a correction image 36 in a deconvolution. This deconvolution is implemented in at least two stages.

Initially, the frequency ranges are extracted individually with the respective carrier frequencies from the correction raw image 32 (extraction 34). Then, n spectra 35.0, 35.1, 35.2 are obtained, each of which are centered around one of the carrier frequencies 35.f0, 35.f1, 35.f2. These carrier frequencies are the carrier frequencies that were already described for the simulated image 24; 35.f0 is the same carrier frequency as 24.f0. The carrier frequencies correspond to the t highest orders of diffraction. This is the case if the terms of the highest orders of diffraction were not used in the simulation. If they are used, filtering must be carried out here, said filtering suppressing the r highest orders of diffraction or the associated carrier frequencies and the sample components modulated thereon. Naturally, such a filtering step can also be additionally carried out, in order to suppress artifacts, if the terms of the highest orders of diffraction are not taken into account in the simulation. Additionally, as already mentioned above, a change is possible, i.e., the terms of the highest orders of diffraction are not used in one iteration through the iteration loop but they are used in a second iteration where there is the suppression following the extraction 34.

The spectra obtained in such individual fashion then need to be shifted to the appropriate site in the frequency domain such that its center is located at the locations of the carrier frequencies. Shifted spectra 38 are obtained. As is yet to be explained below, filtering is carried out within the scope of this shift, said filtering suppressing the spectral information modulated onto the carrier frequencies of the highest orders of diffraction together with the carrier frequencies. Subsequently, the spectra are then combined in an addition 40 to form the correction image 36. By way of example, the iteration is terminated if no significant need for correcting the correction image 36 is indicated in step S2e.

Below, the mathematical background for the image evaluation method on the basis of the Richardson-Lucy deconvolution process is explained in exemplary fashion for the strip-shaped SIM illumination pattern 15, with reference being made to FIG. 5. In this case, fluorescence microscopy is considered, and so the illumination corresponds to an excitation.

In the considered case, the illumination pattern 15 consists of a sequence of strips which can be generated by the three partial beams 14.3a-14.3c in the illumination pupil 8 (see above) such that the illumination pattern 15 is described by the following equation:

$$I(x,y,z,\varphi)=a_0^2/2+a^2+a^2\cos(2*\hat{k}_x x+2*\hat{k}_y y+2\varphi)+2*aa_0 \cos(\hat{k}_x x+\hat{k}_y y+\varphi)*\cos((\hat{k}-\hat{k}_z)z-\varphi_0) \quad (1)$$

Here, $a_0$ is the intensity of the central partial beam 14.3a and a is the intensity of the partial beams 14.3b, 14.3c adjacent on both sides $\hat{k}_x$, $\hat{k}_y$, $\hat{k}_z$ are the x, y and z components of the wave vector of the lateral partial beams 14.3b, 14.3c. $\hat{k}$ is the z-component of the wave vector of the central partial beam 14.3a, $(\hat{k}-\hat{k}_z)$ describes the depth-dependence of the illumination pattern 15, which is formed by a cosine that is centered about a central plane, as a rule the focal plane of the illumination. Such a depth structure is also referred to as a Talbot pattern. $\varphi_0$ is the phase angle of this cosine curve (Talbot pattern) in relation to the z-coordinate. As easily shown by a Fourier transform, the illumination pattern is characterized by signal components with discrete spatial frequencies, which correspond to orders of diffraction.

$\varphi$ denotes the phase angle of the illumination pattern 15 in the xy-plane; i.e., it is the parameter denoting the individual displacement position of the SIM illumination pattern. They differ from one another only in terms of the value for $\varphi$. By way of example, in the case of five individual SIM illumination patterns there are five different values for $\varphi$. Below, this is expressed by an index m. Equation (1) supplies the illumination pattern functions 26, one for each phase angle $\varphi_m$. In the case of the strip grid, the phase angles are preferably equally distributed over $\pi$ within certain limits. A rotation of the SIM illumination pattern remains unconsidered here; i.e., the explanation given here is restricted to the 1-D case of resolution increase, which is given transversely to the longitudinal direction of the strip grid.

The sample image, i.e., the emitted intensity $I_{em}$ in the case of fluorescence microscopy, corresponds to a multiplication of the illumination pattern intensity $I(x, y, z, \varphi)$ by the (initially unknown) sample intensity $S(x, y, z)$ and the PSF of the microscopic imaging, $H(x, y, z)$. Thus, the following is obtained:

$$I_{em}(x,y,z,z_0,\varphi)=\int dx'dy'dz'I(x',y',z',\varphi)S(x',y',z_0-z')H(x-x', y-y',z+z') \quad (2)$$

In Equation (2), z denotes the depth coordinate; $z_0$ is an additional depth distance. The position of the focal plane of the illumination, i.e., the central plane of the Talbot pattern, is at z=0. $z_0$ denotes the distance of a plane from the focal plane for the case of z=0.

As shown in Equation (2), the high spatial frequencies of the sample are modulated onto the comparatively low illumination pattern frequencies, which therefore serve as carrier frequencies. As a result, the SIM illumination and the imaging for each raw image cause a moiré image, the pattern of which contains the sample information in the frequency regions which, considered on their own, are located beyond the diffraction limit of the optical unit.

The target of the image evaluation described now is that of extracting the frequencies of the sample information from the moiré image and put these together to form the image of the sample. This requires a plurality of raw images with different phase angles, i.e., different values $\varphi_m$ for $\varphi$, of the illumination pattern so that the frequencies of the sample information are able to be separated and are able to be shifted into the higher frequency bands associated therewith, which frequency bands attain the increase in resolution.

If z=0, the following is obtained as intensity from a plane of the sample which is spaced apart from the focal plane of the illumination by $z_0$:

$$I_{em}(x,y,z_0,\varphi)=\int dx'dy'dz'I(x',y',z',\varphi)S(x',y',z_0-z')H(x-x', y-y',z') \quad (3)$$

In the Richardson-Lucy iteration method used here in exemplary fashion, this equation is used to calculate n simulated raw images 28 from the estimated image 24, which is used as the estimate for the actual sample intensity $S(x, y, z)$. The generation of the simulated raw images 28 represents a simulation of imaging the sample (in the form of the estimated image 24), which is why the illumination pattern functions 26 and the PSF 27 are included (cf. FIG. 5). Purely by way of example, the explanation is now restricted to the case where the t highest orders of diffraction are not taken into account in the simulation by virtue of the corresponding terms of the illumination pattern function not being used in the simulation, which is carried out in the frequency domain. That there is a possible alternative to this has already been described, but this is not considered in any more detail below for the sake of a simpler description.

The calculation is carried out in the frequency domain, which is advantageous in view of the subsequent deconvolution. A Fourier transform in x, y and z yields (a superscript index "f" denotes reference to the frequency domain below):

$$I_{em}^f(k_x,k_y,k_z,\varphi)=\int dk'_x dk'_y dk'_z I^f(k'_x,k'_y,k'_z,\varphi)S^f(k_x-k'_x,k_y-k'_y,k'_z)H^f(k'_x,k'_y,k_z-k'_z) \quad (4)$$

If Equation (1) is inserted into Equation (4), this yields:

$$I_{em}^f(k_x,k_y,k_z,\varphi)=A_0 H^f(k_x,k_y,k_z)S^f(k_x,k_y,k_z)+A_2 H^f(k_x,k_y,k_z)\{S^f(k_x+2\hat{k}_x,k_y+2\hat{k}_y,k_z)e^{-i2\varphi}+S^f(k_x-2\hat{k}_x,k_y-2\hat{k}_y,k_z)e^{i2\varphi}\}+A_1\{H^f(k_x,k_y,k_z+[\hat{k}_z-\hat{k}])e^{i\varphi_0}+H^f(k_x,k_y,k_z-[\hat{k}_z-\hat{k}])e^{-i\varphi_0}\}S^f(k_x+\hat{k}_x,k_y+\hat{k}_y,k_z)e^{-i\varphi}+A_1\{H^f(k_x,k_y,k_z+[\hat{k}_z-\hat{k}])e^{i\varphi_0}+H^f(k_x,k_y,k_z-[\hat{k}_z-\hat{k}])e^{-i\varphi_0}\}S^f(k_x-\hat{k}_x,k_y-\hat{k}_y,k_z)e^{i\varphi} \quad (5)$$

$A_j$ with j=0, 1, 2 are the intensities of the p orders of diffraction of the illumination pattern, which emerge from the pre-factors in Equation (1). The following applies: $A_0=a_0^2/2+a^2$; $A_1=a^2$ and $A_2=a_0 a$. Further, $k=(k_x, k_y, k_z)$ is the wave vector which refers to the orders of diffraction, i.e., the carrier frequencies. Equation (5) deliberately ignores the terms of the highest orders of diffraction, i.e., the orders of diffraction++2, −2, which can be identified due to the fact that there are no terms with the prefactor $A_2$. By way of example, p=5, n=3, t=2 applies in the exemplary embodiment.

On account of the n different displacement positions of the illumination pattern 15, Equation (5) is also obtained n-times—once for each of the phases $\varphi=\varphi_m$, m=1, . . . , n. Each equation supplies a simulated raw image 28, and so, e.g., n=3 simulated raw images 28 arise (iteration step S2b).

Then, the iterative method carries out a comparison between the simulated raw images 28, denoted as $I_{em}$ (x, y, $z_0$, $\varphi$), and the provided raw images 30, written as $I_{em}^M$ (x, y, $z_0$, $\varphi$) below, in each iteration (iteration step S2c). The difference is evaluated in each iteration and subsequently has an effect as an update of the estimated image 24 of the sample. Since the image representation, i.e., the provided raw images 30, is subject to a Poisson statistic, the difference between the simulated raw images 28 and the provided raw images 30 is preferably expressed as a ratio; other comparison measures are possible:

$$R(x, y, z_0, \varphi) = \frac{I_{em}^M(x, y, z_0, \varphi)}{I_{em}(x, y, z_0, \varphi)} \quad (6)$$

The difference R represents correction raw images 32, once again with the phases $\varphi=\varphi_m$, m=1, . . . , n as individualizing parameter.

In a deconvolution process, the correction raw images 32 are converted into a correction image 36 of the sample, which is then used in iteration step S2e to carry out the update of the estimated image 24.

For deconvolution purposes, the correction raw images 32 are Fourier transformed:

$$R^f(k,\varphi)=R^f(k_x,k_y,k_z,\varphi)=FT\{R(x,y,z_0,\varphi)\} \quad (7)$$

The n individual spectra $S_R^f$ are extracted from the correction raw images 32. In FIG. 5, they are symbolized at 35.0 to 35.2 and are the result of an extraction 34 for which the OTF needs to be used (more precisely, the complex conjugate OTF* must be used since this is a deconvolution). The spectra must be shifted to certain sites in the frequency domain for each of the (p–t) orders of diffraction, i.e., carrier frequencies, specifically to the locations $(k+j\hat{k}_g)$, where $j=(0, -1, 1)$. Here, $\hat{k}_g=[\hat{k}_x, \hat{k}_y, 0]$ denotes the wave vector for the orders of diffraction, i.e., the carrier frequencies, and hence the sites in the frequency domain which are assigned to the carrier frequencies and to which the spectra should be shifted. In FIG. 5, the frequencies in the non-shifted state are denoted by 35.f0 to 35.f2. Since the terms for the highest two orders of diffraction were not incorporated in the simulation, the corresponding frequencies assigned to these two highest orders of diffraction and the spectra arranged therearound, they would be 35.f3 and 35.f4, are preferably filtered out in this case.

The spectra obtained thus are shifted according to the wave vectors (filtering and displacement 37 in FIG. 5). The index j once again individualizes the shifts. The number of shifts defines the number of necessary phases for the position of the illumination pattern 15. Thus, there are exactly n different values for j and for m.

Moreover, there is optional filtering by virtue of each spectrum being multiplied by a function $g_n(k)$ $g_n(k_x, k_y, 0)$. In this case, the exemplary embodiment is a notch filter with Gaussian form, which satisfies the following equation (other filter functions are equally possible):

$$g_n(k) = g_n(k_x, k_y, 0) = 1 - b_n \exp\left\{-\frac{(k_x - j\hat{k}_x)^2}{2\sigma_n^2} - \frac{(k_y - j\hat{k}_y)^2}{2\sigma_n^2}\right\} \quad (8)$$

The factor $b_n$ is used to set the degree of suppression (between 0 and 1). The variable $\sigma_n$ sets the width of the filter. The values should be chosen to fit to the applicable conditions and can be established by simple trials. In this case, different values can be used for the orders of diffraction. Preferably, $b_n$ is greatest for the zero order of diffraction. The values for $j=\{0, -1, 1\}$ denote the orders of diffraction suppressed or attenuated by the filter; $j=0$ filters the zero order of diffraction (fundamental frequency; see above) and $j=-1, +1$ filters the first orders of diffraction (first higher spatial frequency; see above). It is not necessary for all orders of diffraction to be filtered. It is expedient to filter the zero order of diffraction in any case. The same filtering principle can also be used for the additional attenuation of the t highest orders of diffraction; however, the width of the filter should be chosen differently in that case, specifically to be larger.

These processes (extraction 34, filtering and displacement 37) can be combined mathematically in the following system of equations, on the basis of which the correction raw images 32 are deconvolved to form the correction image 36 (iteration step S2d):

$$\begin{bmatrix} S_R^f(k) \\ S_R^f(k+\hat{k}_g) \\ S_R^f(k-\hat{k}_g) \end{bmatrix} = \begin{bmatrix} g_0(k)OTF_0^*(k) & 0 & 0 \\ 0 & g_{-1}(k)OTF_{-1}^*(k) & 0 \\ 0 & 0 & g_1(k)OTF_1^*(k) \end{bmatrix} \times \quad (9)$$

$$\left\{ \begin{bmatrix} A_0 & A_0 & A_0 & A_0 & A_0 \\ A_1 e^{i\varphi_1} & A_1 e^{i\varphi_2} & A_1 e^{i\varphi_3} & A_1 e^{i\varphi_4} & A_1 e^{i\varphi_5} \\ A_1 e^{-i\varphi_1} & A_1 e^{-i\varphi_2} & A_1 e^{-i\varphi_3} & A_1 e^{-i\varphi_4} & A_1 e^{-i\varphi_5} \end{bmatrix} \begin{bmatrix} R^f(k, \varphi_1) \\ R^f(k, \varphi_2) \\ R^f(k, \varphi_3) \end{bmatrix} \right\}$$

It is evident that only three orders of diffraction are taken into account in the reconstruction in this example; the two highest orders of diffraction are not taken into account.

Since this is a deconvolution, the complex conjugate OTFs, which are denoted by a *, appear in Equation (7). Equation (9) multiplies each correction raw image 32 by the complex conjugate OTF*$_n$ of the optical transfer function OTF$_n$ that fits to the respective shift:

$$OTF_j(k_x, k_y, k_z) = H^f(k_x, k_y, k_z), j=0$$

$$OTF_j(k_x, k_y, k_z) = H^f(k_x, k_y, k_z + [\hat{k}_z - \hat{k}])e^{+i\varphi_0} + H^f(k_x, k_y, k_z + [\hat{k}_z - \hat{k}])e^{-\varphi_0}, j=-1,1 \quad (10)$$

The n spectra $S_R^f$ $(k+j\hat{k}_g)$ (with $j=0, -1, 1$) obtained are added (summation 40 in FIG. 5) and inverse Fourier transformed in order to obtain the correction image 36, $S^R$(x, y, z). According to the Richardson-Lucy deconvolution algorithm, the next estimated image 24 of the sample is obtained by multiplying the last estimated image with the correction image 36 (update in iteration step S2e):

$$S_{q+1}(x,y,z) = S_q(x,y,z) \times S^R(x,y,Z) \quad (11)$$

Here, the index q+1 denotes the updated estimated image and the index q denotes the last estimated image. Naturally, the update (iteration step S2e) is the inverse operation to the comparison (iteration step S2c). Should it not have been a division but, for example, a difference that was used in S2c, then the update also has to be adapted accordingly, for example to a summation.

The update rule from the correction image 36 to the new estimated image 24 substantially follows the following relationship:

$$S_{q+1}(x, y, z_0) = \quad (12)$$
$$S_q(x, y, z_0) \times \sum_{m=1}^n \frac{I_{em}^M(x, y, z_0, \varphi_m)}{I_{em}(x, y, z_0, \varphi_m)} \otimes H^f(x, y, z_0) \, I(x, y, z_0, \varphi_m)$$

In the equation above, the fraction represents the generation of the n correction raw images 32 (n=3 in this example), i.e., the iteration step S2c. As is conventional, $\otimes$ denotes the convolution operator. For simplification purposes, the filtering is not contained here; it would be part of the deconvolution.

The update need not be carried out in the spatial domain. To shorten the calculation method, the entire iteration can be undertaken in the frequency domain. To this end, it is only necessary to initially carry out a Fourier transform of the very first estimated image and an inverse transform of the estimated image following the last update at the end. FIG. 5 shows this computationally sparing variant, i.e., only relates to the frequency domain.

The approach explained previously for a strip pattern, e.g., n=3, can very easily be extended to the multi-point SIM illumination pattern, too, for example an illumination pattern that can be generated from five partial beams which are arranged in the illumination pupil in the form of the five spots of a die (cf. FIG. 3B). If $a_0$ denotes the intensity of the central beam and a denotes the intensity of the remaining beams, then the following is obtained:

$$I(x,y,z) = a_0^2/2 + 2*a^2 + 2*a^2 \cos(2*\hat{k}_y y + \varphi_y) + 2*aa_0 \cos(\hat{k}_x x + \hat{k}_y y + \varphi_{-20})*\cos((\hat{k} - \bar{k}_z)z - \varphi_0) + 2*a^2 \cos(2*\hat{k}_x x + \varphi_x) + a^2 \cos(2*\hat{k}_x x + 2*\hat{k}_y y + \varphi_{-22}) + 2*aa_0 \cos(\hat{k}_x x - \hat{k}_y y + \varphi_{-10})*\cos((\hat{k} - \hat{k}_z)z - \varphi_0) + a^2 \cos(2*\hat{k}_x x - 2*\hat{k}_y y + \varphi_{-1}) \quad (13)$$

This illumination pattern leads to p=13. Otherwise, the mathematics for the algorithm described above for the case p=5 apply analogously, with the variables $\varphi_x$, $\varphi_y$, individualizing the displacement positions.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

The invention claimed is:

1. A method for performing Structured Illumination Microscopy (SIM) on a sample, comprising:
generating raw images of the sample, for each raw image by illuminating the sample using an identical SIM illumination pattern, with an individual shift for each raw image, wherein the SIM illumination pattern is characterized by p orders of diffraction, and
generating an image of the sample by evaluating n of the raw images in an image reconstruction,
wherein the image reconstruction comprises suppressing t highest orders of diffraction of the p orders of diffraction and selecting t such that n=p−t applies, with t being an integer larger zero, wherein not all of the p orders of diffraction are used in the image reconstruction and the number n of raw images evaluated is lower than the number p of the orders of diffraction characterizing the SIM illumination pattern.

2. The method as claimed in claim 1, further comprising optically generating the SIM illumination pattern, and attenuating the t highest orders of diffraction of the p orders of diffraction characterizing the SIM illumination pattern.

3. The method as claimed in claim 2, further comprising providing the SIM illumination pattern by generating, in an illumination objective pupil having a center and a diameter, an illumination light point pattern including illumination light points, wherein the t highest orders of diffraction attenuated by the attenuating step are the illumination light points at a location furthest away from the center of the illumination objective pupil, wherein said location is located on at least 80% of the diameter of the illumination objective pupil.

4. The method as claimed in claim 1, wherein suppressing the t highest orders of diffraction in image reconstruction comprises a filtering step in a frequency domain.

5. The method as claimed in claim 1, wherein the n raw images are used as recorded raw imaged and the image reconstruction comprises a Richardson-Lucy iteration method, which includes generating simulated raw images and comparing the simulated raw images with the recorded raw images in an iteration loop to attenuate and suppress the t highest orders.

6. The method as claimed in claim 1, wherein the image reconstruction comprises a Richardson-Lucy iteration method, including calculating simulated raw images in an iteration loop and using only the n lowermost orders of diffraction in the iteration method.

7. The method as claimed in claim 1, wherein the image reconstruction comprises decoding of a moiré pattern present in the raw images by setting up a linear system of equations of n equations and solving this system of equations.

8. The method as claimed in claim 1, wherein the image reconstruction comprises decoding of a moiré pattern present in the raw images by setting up a linear, underdetermined system of equations of p equations and solving this system of equations.

9. The method as claimed in claim 8, further comprising solving the system of equations by an approximation or extrapolation method.

10. The method as claimed in claim 9, wherein the approximation method comprises a singular value decomposition process.

11. The method as claimed in claim 1, wherein the SIM illumination pattern is a strip pattern and n=3, p=5, t=2 applies.

12. The method as claimed in claim 1, wherein the individual shift of the SIM illumination pattern additionally comprises displacing the SIM illumination pattern into three different displacement positions and rotating the SIM illumination pattern into three different rotational positions per displacement position such that a total of 9 raw images are recorded.

13. The method as claimed in claim 1, wherein the SIM illumination pattern is a multi-point pattern and n=9, p=13, t=4 applies.

14. The method as claimed in claim 3, wherein said location is located in the range of 90% to 95% of the diameter.

15. The method as claimed in claim 3, wherein said location is located in the range of 80% to 85% of the diameter.

16. The method as claimed in claim 3 wherein said location is located in the range of 85% to 90% of the diameter.

* * * * *

UNITED STATES PATENT AND TRADEMARK OFFICE
CERTIFICATE OF CORRECTION

PATENT NO. : 11,867,894 B2
APPLICATION NO. : 17/470456
DATED : January 9, 2024
INVENTOR(S) : Ingo Kleppe et al.

It is certified that error appears in the above-identified patent and that said Letters Patent is hereby corrected as shown below:

In the Specification

Column 2, Line 14   now reads: "Chemical Reviews 17"
                    should read: -- Chemical Reviews 117 --

Column 2, Line 35   now reads: "(2000):"
                    should read: -- (2000); --

Column 2, Line 40   There is too much space between "4" and "fdc-81" ...in the URL address Column 2, Line 44   now reads: "A1:"
                    should read: -- A1; --

Column 2, Line 51   now reads: "(2016):"
                    should read: -- (2016); --

Column 3, Line 1    now reads: "By (2010):"
                    should read: -- Bv (2010): --

Column 6, Line 19   now reads: "reconstruction. e.g."
                    should read: -- reconstruction, e.g. --

Column 6, Line 40   now reads: "800%"
                    should read: -- 80% --

Column 10, Line 61  now reads: "in partial step S2$d$"
                    should read: -- in partial step S2$dl$ --

Column 16, Line 22  now reads: "the r highest orders"
                    should read: -- the t highest orders --

Signed and Sealed this
Twenty-sixth Day of March, 2024

Katherine Kelly Vidal
*Director of the United States Patent and Trademark Office*

CERTIFICATE OF CORRECTION (continued)
U.S. Pat. No. 11,867,894 B2

| | |
|---|---|
| Column 18, Line 13 | now reads in the beginning of the equation: "$Iem^f$"<br>should read: -- $I^f em$ -- |
| Column 18, Line 17 | now reads in the beginning of the equation: "$Iem^f$"<br>should read: -- $I^f em$ -- |
| Column 18, Line 29 | now reads: "diffraction++2, -2"<br>should read: -- diffraction +2, -2 -- |
| Column 18, Line 40 | now reads at the end: "$I_{em}{}^M$"<br>should read: -- $I^M{}_{em}$ -- |
| Column 19, Line 24 | now reads: "$g_n(k)\ g_n(kx, ky, 0)$"<br>should read: -- $g_n(k) = g_n(kx, ky, 0)$ -- |
| Column 20, Line 65 | now reads in the middle of line two of the equation: "$(\hat{k} - \overline{k_z})$"<br>should read: -- $(\hat{k} - \hat{k_z})$ -- |
| Column 20, Line 68 | now reads at the end of the equation: "$-_1$"<br>should read: -- $-_{11}.$ -- |